(12) United States Patent
Mizuta

(10) Patent No.: US 8,382,158 B2
(45) Date of Patent: Feb. 26, 2013

(54) ALL TERRAIN VEHICLE

(75) Inventor: Fumio Mizuta, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 130 days.

(21) Appl. No.: 12/915,617

(22) Filed: Oct. 29, 2010

(65) Prior Publication Data

US 2012/0104738 A1 May 3, 2012

(51) Int. Cl.
*B62D 1/16* (2006.01)
(52) U.S. Cl. ....................................... 280/779
(58) Field of Classification Search .............. 280/89, 280/89.1, 89.11, 93.51, 779, 93.513, 771, 280/781; 180/311
See application file for complete search history.

(56) References Cited

U.S. PATENT DOCUMENTS

| | | | | |
|---|---|---|---|---|
| 4,700,963 A * | 10/1987 | Burns et al. | .................... | 280/276 |
| 6,170,841 B1 * | 1/2001 | Mizuta | ............................ | 280/89 |
| 6,702,058 B2 * | 3/2004 | Ishii et al. | ...................... | 180/311 |
| 7,618,063 B2 * | 11/2009 | Takeshima et al. | ............ | 280/785 |
| 7,950,491 B2 * | 5/2011 | Isoda et al. | ..................... | 180/311 |
| 2004/0032120 A1 * | 2/2004 | Vaisanen et al. | ................ | 280/771 |
| 2006/0180385 A1 * | 8/2006 | Yanai et al. | ..................... | 180/444 |
| 2007/0095601 A1 * | 5/2007 | Okada et al. | ................... | 180/444 |

FOREIGN PATENT DOCUMENTS

JP 64-1089 6/1989

* cited by examiner

*Primary Examiner* — Eric Culbreth
*Assistant Examiner* — Robert A Coker
(74) *Attorney, Agent, or Firm* — Alleman Hall McCoy Russell & Tuttle LLP

(57) ABSTRACT

An all terrain vehicle includes a steering shaft to which a handle is coupled, a pair of right and left frame members extending in a longitudinal direction of a vehicle body, at both sides in a width direction of the vehicle body, a steering shaft support member provided over and coupled to the pair of right and left frame members, and a bearing configured to rotatably couple a lower portion of the steering shaft to the steering shaft support member.

9 Claims, 6 Drawing Sheets

ALL TERRAIN VEHICLE

BACKGROUND OF THE INVENTION

1. Field of the Invention

The present invention relates to an all terrain vehicle (ATV) configured to suitably drive off-road.

2. Description of the Related Art

In a conventional all terrain vehicle, the lower end portion of a steering shaft coupled to a handle is supported on a differential gear case. To be specific, a bearing seat is mounted on a boss protruding from the upper portion of a differential gear, and the lower end portion of the steering shaft is coupled to a bearing mounted on the bearing seat (see e.g., Japanese Utility Model Application Publication No. Sho 64-1089).

During driving off road of the all terrain vehicle, a large external force is applied from a road surface to the tires. The force is transmitted to a differential gear case via an axle and then to a bearing to which the lower end portion of a steering shaft is coupled. In this case, if a strong force is applied to the bearing, the force generates a rotational resistance to the steering shaft, which possibly degrades the driver's steering feel. In a conventional all terrain vehicle, since the differential gear case is coupled to the bearing to which the steering shaft is coupled, a reactive force is generated in the bearing with respect to a vibration of the differential gear case, which degrades suspension operation feel during driving off-road.

SUMMARY OF THE INVENTION

According to the present invention, an all terrain vehicle comprises a steering shaft to which a handle is coupled; a pair of right and left frame members extending in a longitudinal direction of a vehicle body, at both sides in a width direction of the vehicle body; a steering shaft support member provided over and coupled to the pair of right and left frame members; and a bearing configured to rotatably couple a lower portion of the steering shaft to the steering shaft support member.

In accordance with such a configuration, the bearing coupled to the lower portion of the steering shaft is coupled to the steering shaft support member coupled to the frame member. In this structure, if a large external force is applied from a road surface to a wheel during driving off-road, it is not directly transmitted to the bearing to which the lower portion of the steering shaft is coupled. This allows the bearing to operate smoothly and improves the driver's steering feel during driving off-road. In addition, since the external force applied from the road surface to the wheel is not directly transmitted to the bearing, a suspension operates smoothly, which improves suspension operation feel during driving off-road.

The above and further objects, features and advantages of the invention will more fully be apparent from the following detailed description with reference to the accompanying drawings.

DETAILED DESCRIPTION OF THE PREFERRED EMBODIMENTS

Hereinafter, an embodiment of the present invention will be described with reference to the drawings. As used herein, the directions are referenced from a driver mounting an all terrain vehicle, unless otherwise explicitly noted.

Figure 1:
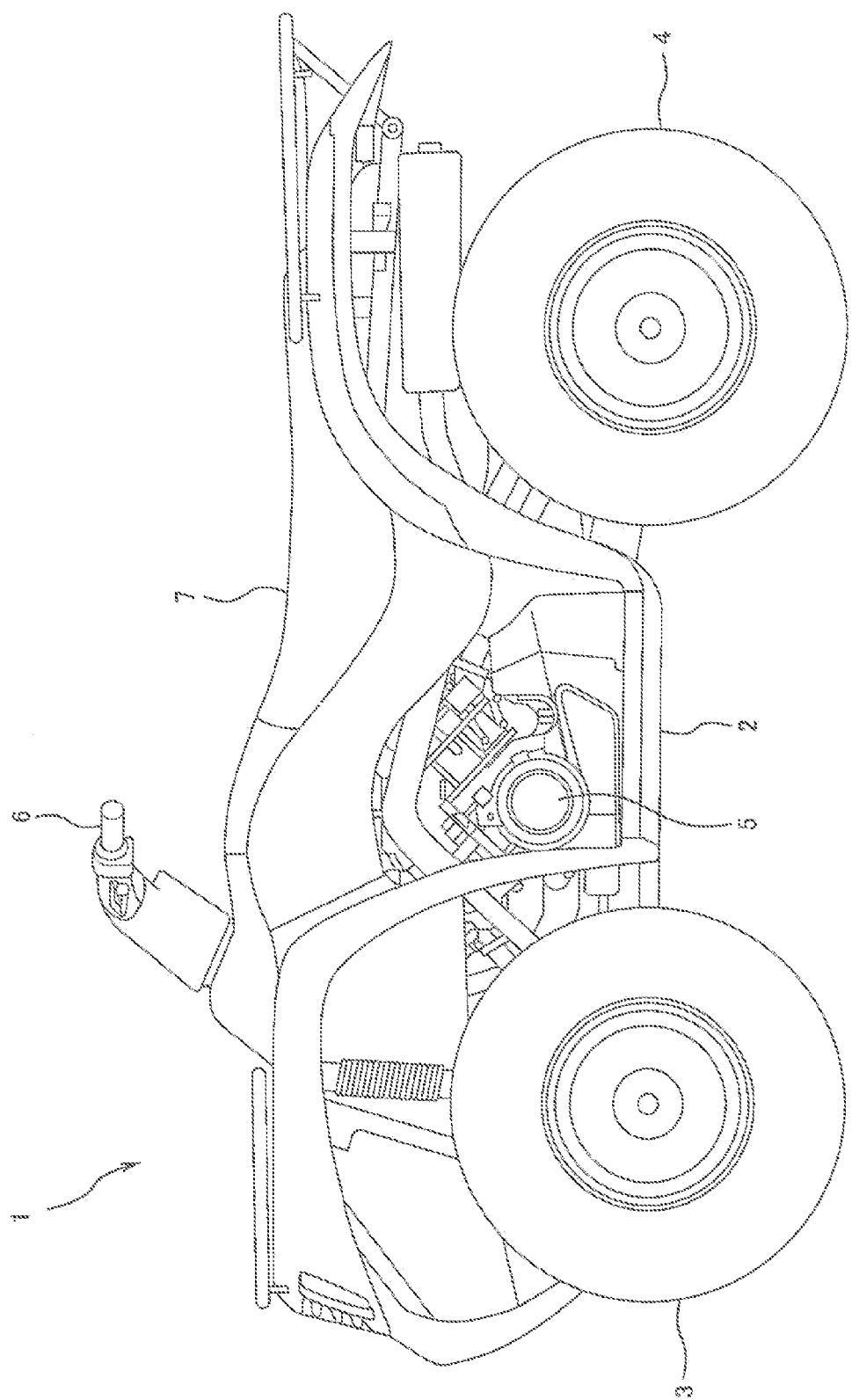
FIG. 1 is a left side view of an all terrain vehicle according to an embodiment of the present invention.

FIG. 1 is a left side view of an all terrain vehicle 1 according to an embodiment of the present invention. Turning to FIG. 1, the all terrain vehicle 1 is a straddle-type four-wheeled vehicle, including a vehicle body frame 2 formed by a weld assembly mainly including metal-made pipes, front wheels 3 suspended at the front portion of the vehicle body frame 2, and rear wheels 4 suspended at the rear portion of the vehicle body frame 2. An engine 5 is positioned between the front wheels 3 and the rear wheels 4 and mounted to the vehicle body frame 2. A bar-type steering handle 6 is provided behind and above the front wheels 3 for the driver to steer the vehicle 1. A seat 7 straddled by the driver is mounted behind the handle 6.

Figure 2:
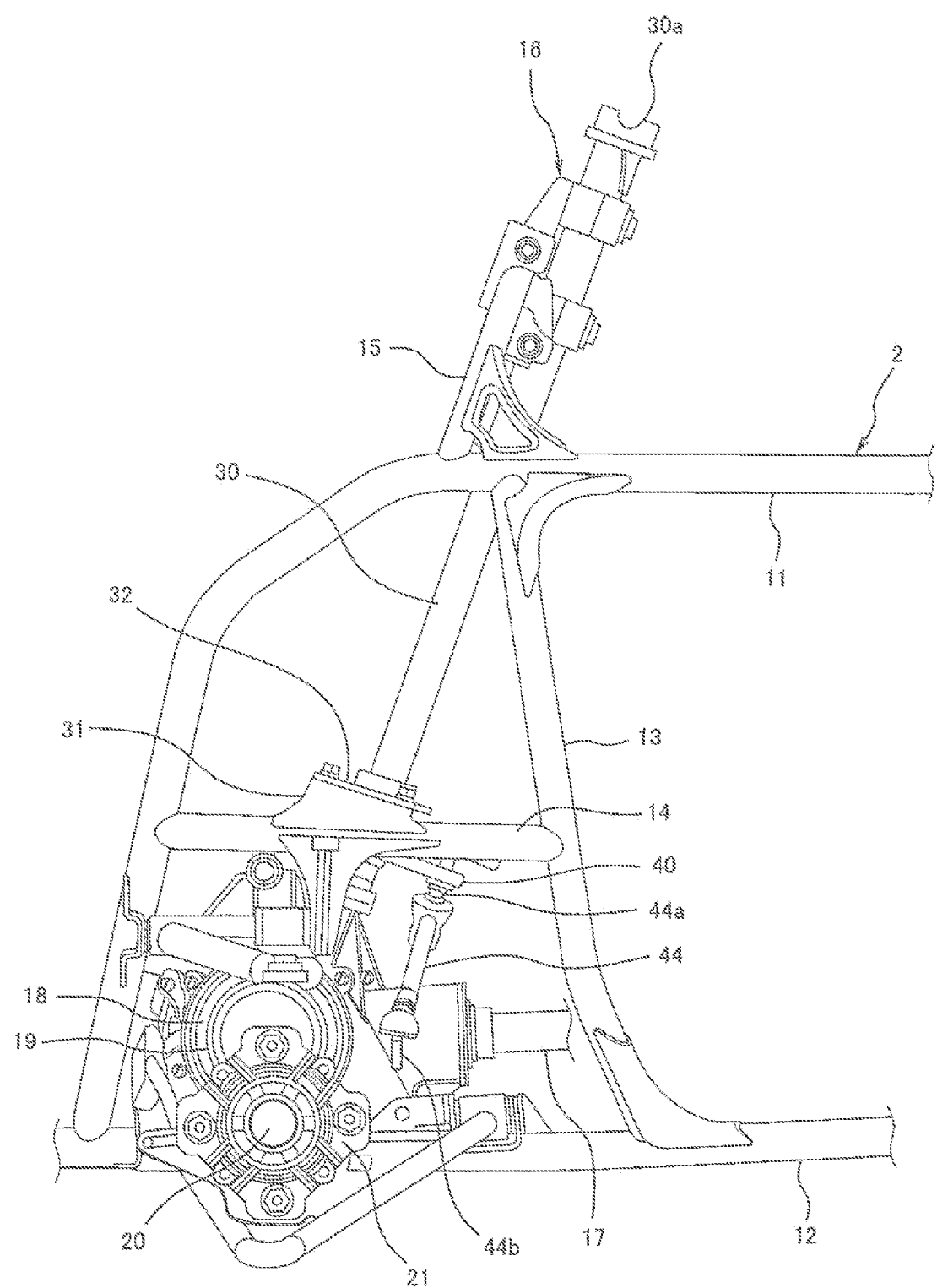
FIG. 2 is a left side view of constituents surrounding a steering shaft of the all terrain vehicle of FIG. 1.

FIG. 2 is a left side view of constituents surrounding a steering shaft 30 of the all terrain vehicle 1 of FIG. 1. As shown in FIG. 2, the vehicle body frame 2 includes a pair of right and left upper main frame members 11 extending in the longitudinal direction of a vehicle body of the vehicle 1, at both sides in a width direction of the vehicle body, and a pair of right and left lower main frame members 12 extending in the longitudinal direction below the upper main frame members 11 at both sides in the width direction. The lower ends of the portions tilted in a downward direction at the front portions of the upper main frame members 11 are coupled to the lower main frame members 12, respectively. A gusset frame member 13 vertically extending to be slightly tilted is coupled to the upper main frame member 11 and to the lower main frame member 12. A sub-gusset frame member 14 extending in the longitudinal direction is coupled to the front portion of the upper main frame member 11 and to the intermediate portion of the gusset frame member 13. A steering support frame member 15 protruding upward is coupled to the front portions of the upper main frame members 11 to couple the right and left upper main frame members 11 to each other. A clamp device 16 is mounted to the steering support frame member 15 to rotatably support the steering shaft 30.

The transaxle device 18 is provided in a region between the lower main frame member 12 and the sub-gusset frame member 14 as viewed from the side, on a center line extending in the longitudinal direction of the all terrain vehicle 1, as viewed from above. A propeller shaft 17 is coupled to the transaxle device 18 to transmit a driving power from the engine 5 (see FIG. 1). The transaxle device 18 includes a gear box 19 accommodating a reduction gear, a differential gear, a two-wheel-drive/four-wheel-drive switching clutch, etc, axles 20 protruding laterally in a rightward and rearward direction from the gear box 19, and a brake unit 21 provided at the tip end of the axles 20 and coupled to the front wheels 3.

The metal-made steering shaft 30 extending vertically to be tilted in a rearward direction is disposed at the front portion of the vehicle body frame 2. The steering shaft 30 extends through a center region between the right and left upper main frame members 11. A handle mounting portion 30a is formed at the upper end portion of the steering shaft 30 to mount the bar-type steering handle 6 (see FIG. 1). A lower portion 30b of the steering shaft 30 is supported by a steering shaft support member 32 such that the steering shaft 30 is rotatable (see FIG. 3). The steering shaft support member 32 accommodates a bearing 35 (see FIG. 3) and is coupled to the pair of right and left sub-gusset frame members 14 via seat members 31, respectively.

A center arm 40 is secured to the lower portion 30b (see FIG. 3) of the steering shaft 30. One end portions 44a of a pair of right and left tie rods 44 are rotatably coupled to the center arm 40. Opposite end portions 44b of the tie rods 44 are rotatably coupled to front wheel support members 46 (see FIG. 3) which are knuckle arms attached to the front wheels 3 (see FIG. 1). An electric motor power steering device is not mounted to the steering shaft 30.

Figure 3:
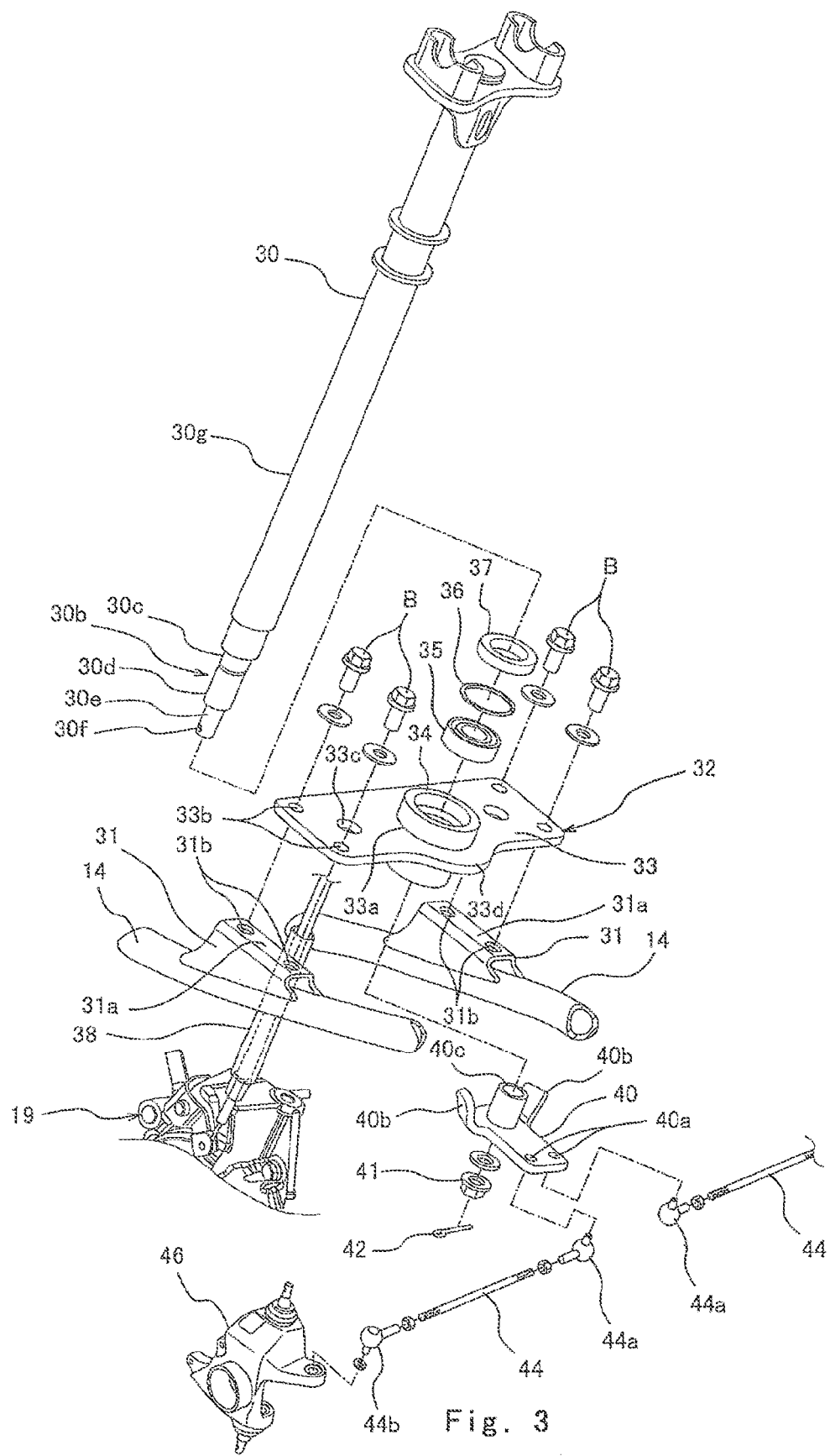
FIG. 3 is an exploded perspective view of the constituents surrounding the steering shaft of the all terrain vehicle of FIG. 2, as viewed from left and rear.
Figure 4:
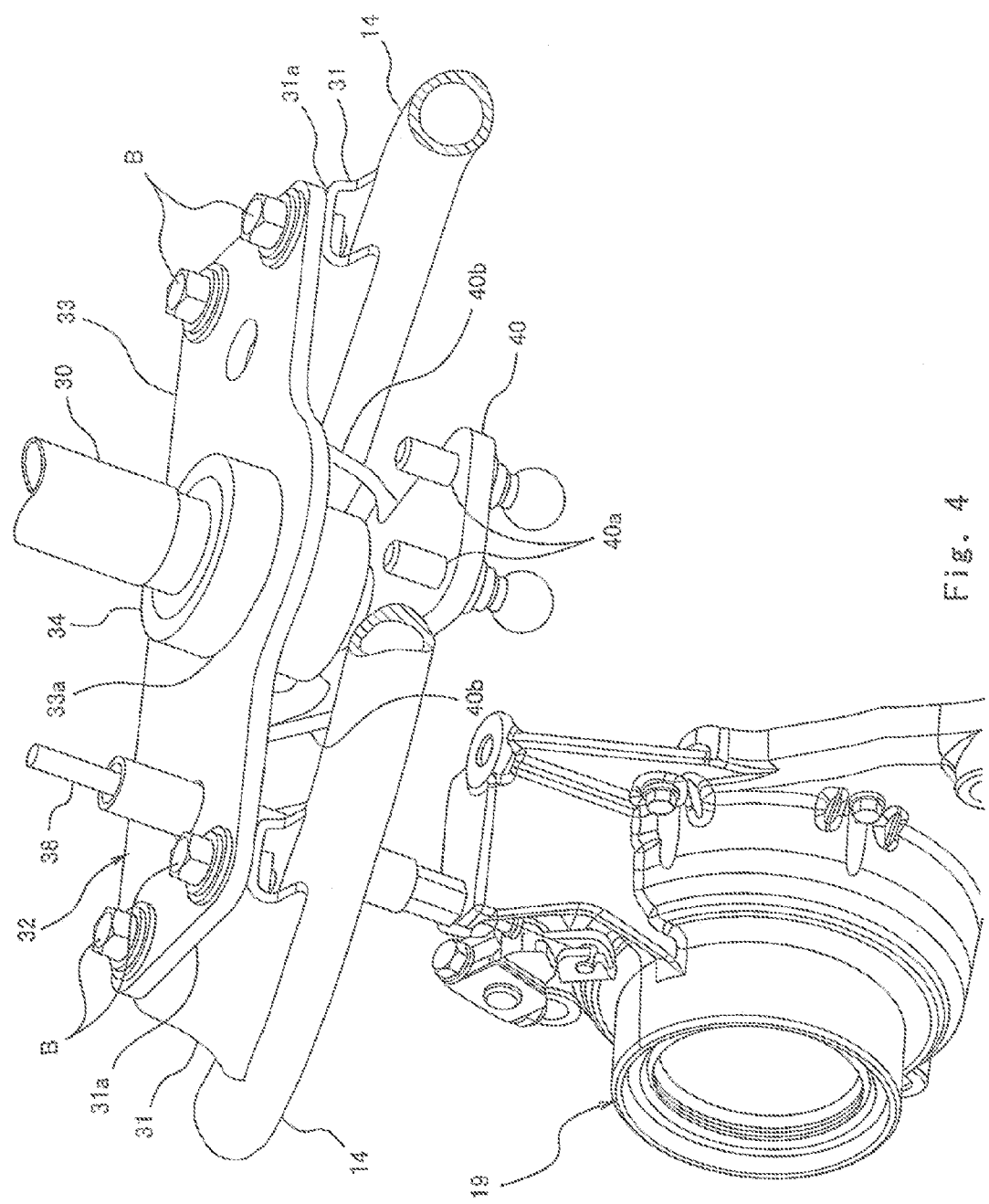
FIG. 4 is a perspective view of the constituents surrounding the steering shaft of the all terrain vehicle of FIG. 3, as viewed from left and rear.

FIG. 3 is an exploded perspective view of the constituents surrounding the steering shaft 30 of the all terrain vehicle 1 of FIG. 2, as viewed from left and rear. FIG. 4 is a perspective view of the constituents surrounding the steering shaft 30 of the all terrain vehicle 1 of FIG. 3, as viewed from left and rear. In FIGS. 3 and 4, a part of the gear box 19 is shown. As shown in FIGS. 3 and 4, the lower portion 30b of the steering shaft 30 includes a supported portion 30c having a smaller diameter than an intermediate portion 30g, a spline portion 30d which is provided under the supported portion 30c and provided with an axial spline on an outer surface thereof, and a tip end portion 30e which is provided under the spline portion 30d, has a smaller diameter than the spline portion 30d and is provided with a pin hole 30f.

Seat members 31 are welded onto the pair of right and left sub-gusset frame members 14, respectively. Each seat member 31 has a cross-section of a substantially inverted-U shape as viewed from the front. Upper surfaces 31a of the seat members 31 are disposed such that their normal line direction substantially conforms to the axial direction of the steering shaft 30. That is, the upper surfaces 31a serve as the support surfaces 31a for supporting the steering shaft support member 32. Bolt holes 31b are formed in desired locations of the support surfaces 31a.

The steering shaft support member 32 includes a plate portion 33 which is disposed over the seat members 31 of the pair of right and left sub-gusset frame members 14 and provided with a shaft insertion hole 33a in a center portion thereof, and a bearing support tubular portion 34 welded to the plate portion 33 with the bearing support shaft tubular portion 34 fitted to the shaft insertion hole 33a. A portion 33d of the plate portion 33 which is located behind the shaft insertion hole 33a protrudes with a curvature in a rearward direction. Bolt holes 33b are formed on each of the left end portion and the right end portion of the plate portion 33 to conform to the bolt holes 31b of the support surface 31a of the corresponding seat member 31. By inserting bolts B into the bolt holes 31b and 33b in a state where the lower surfaces of the left end portion and right end portion of the plate portion 33 are in contact with the support surfaces 31a of the seat members 31 and the bolt holes 31b conform to the bolt holes 33b, respectively, the plate portion 33 is fastened to the seat members 31. In this fastened state, the normal line direction of the plate portion 33 substantially conforms to the axial direction of the steering shaft 30. In some embodiments, at least the bolt holes 31b of the seat member 31 or the bolt holes 33b of the plate portion 33 may be elongated holes, in other embodiments, both bolt holes 31b and bolt holes 33b may be elongated holes. With such elongated holes, the position of the plate portion 33 with respect to the seat members 31 can be easily adjusted.

The bearing support tubular portion 34 accommodates a bearing 35, a circlip 36 and an oil seal 37 in this order from the bottom. The lower portion 30b of the steering shaft 30 is inserted into the bearing support tubular portion 34 through the center of the bearing 35, the center of the circlip 36, and the center of the oil seal 37. The gear box 19 is disposed below the steering shaft support member 32. The gear box 19 is provided with a cable 38 for operating the two-wheel-drive/four-wheel-drive switching clutch. The cable 38 extends through a hole 33c provided on the plate portion 33 of the steering support member 32 and is guided in an upward direction.

The center arm 40 is disposed below the steering shaft support member 32 and coupled to the lower portion 30b of the steering shaft 30. The center arm 40 is disposed such that its rear end portion is tilted in a downward direction. The center arm 40 is provided with tie rod mounting portions 40a at its rear end portion. The one end portions 44a of the tie rods 44 are mounted to the tie rod mounting portions 40a, respectively. A shaft coupling tubular portion 40c protrudes upward from the front end portion of the center arm 40 and is spline-coupled to the lower portion 30b of the steering shaft 30. A pair of right and left stoppers 40b are provided at right and left sides of the front end portion of the center arm 40 to protrude in an obliquely upward direction. Below the center arm 40, a nut 41 is attached to the tip end portion 30e of the steering shaft 30 and a cotter pin 42 is inserted into the pin hole 30f to prevent disengagement of the center arm 40. The tie rods 44 for coupling the tie rod mounting portions 40a of the center arm 40 to the front arm support members 46 are disposed to extend below the sub-gusset frame members 14.

Figure 5:
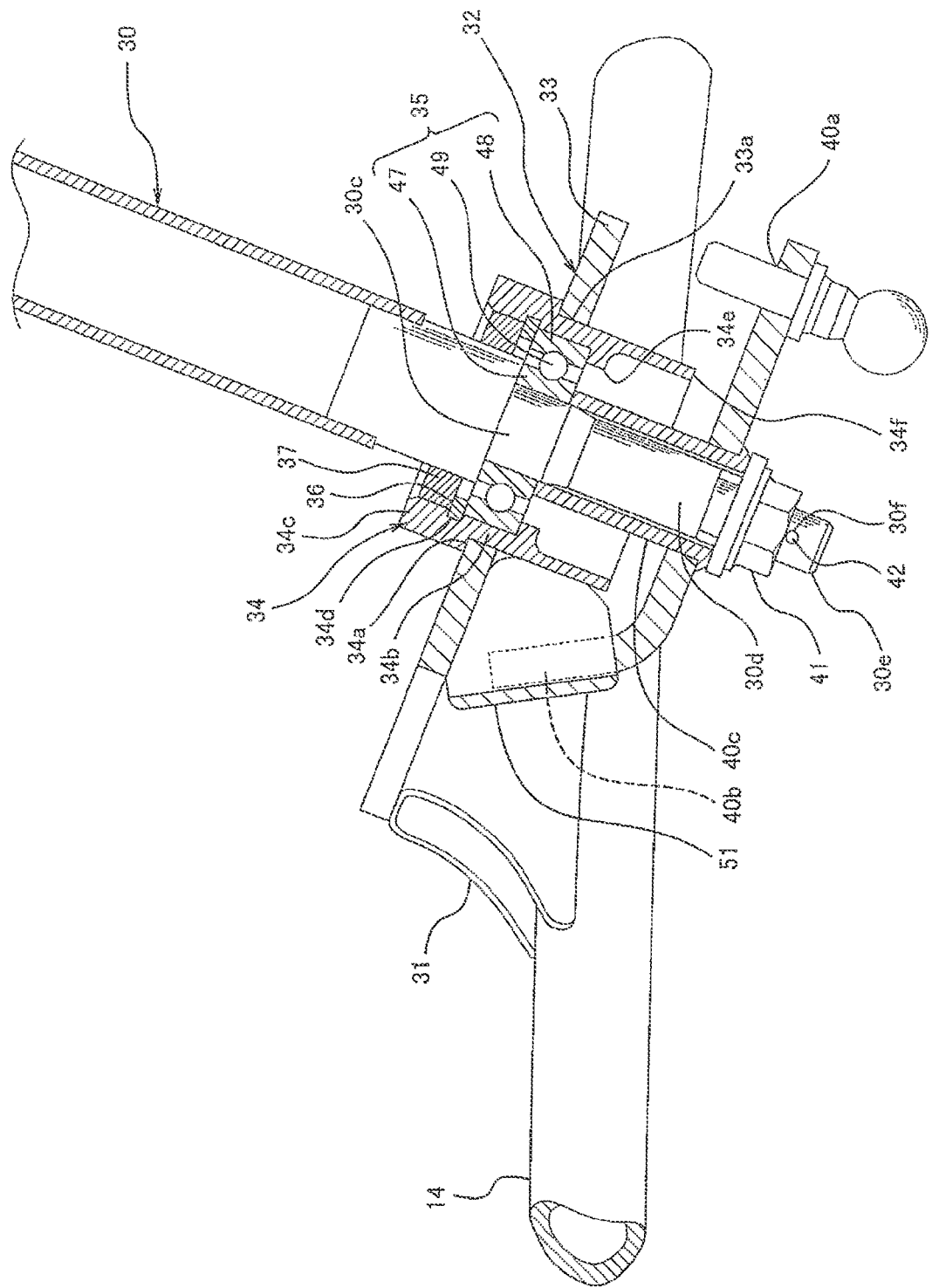
FIG. 5 is a cross-sectional view of the constituents surrounding the steering shaft of the all terrain vehicle of FIG. 4, as viewed from left.

FIG. 5 is a cross-sectional view of the constituents surrounding the steering shaft 30 of the all terrain vehicle 1 of FIG. 4, as viewed from left. As shown in FIG. 5, the bearing support tubular portion 34 has a step 34a having an upper portion with a larger diameter. The bearing support tubular portion 34 is welded to the plate portion 33 with the step 34a in contact with the upper surface of the shaft insertion hole 33a of the plate portion 33. The bearing support tubular portion 34 has a bearing positioning portion 34b for positioning the bearing 35. The bearing positioning portion 34b is disposed on substantially the same plane that the plate portion 33 extends. The bearing positioning portion 34b is provided at its lower portion with a bearing support portion 34e protruding radially inward. The bearing 35 is a ball bearing including an inner ring 47, an outer ring 48, and a ball 49 disposed between the inner ring 47 and the outer ring 48. The outer ring 48 of the bearing 35 positioned by the bearing positioning portion 34b is supported by the bearing support portion 34e from below. The inner ring 47 of the bearing 35 is externally fitted to the supported portion 30c of the steering shaft 30. The bearing positioning portion 34b is provided with an annular groove 34d on an inner peripheral surface of the upper portion thereof. The circlip 36 is fitted into the annular groove 34d and presses the outer ring 48 of the bearing 35 from above. In this state, the bearing 35 is disposed on substantially the same plane that the plate portion 33 extends.

The bearing support tubular portion 34 includes a seal mounting portion 34c protruding upward from the bearing positioning portion 34b. The seal mounting portion 34c accommodates an annular oil seal 37 as a seal member. The bearing support tubular portion 34 includes a lower protruding tubular portion 34f protruding downward from the bearing positioning portion 34b. The protruding length of the lower protruding tubular portion 34f in a downward direction from the plate portion 33 is larger than the protruding length of the seal mounting portion 34c in an upward direction from the plate portion 33. In other words, the protruding length of the lower protruding tubular portion 34f in a downward direction from the bearing positioning portion 34b is larger than the protruding length of the seal mounting portion 34c in an upward direction from the bearing positioning portion 34b.

The shaft coupling tubular portion 40c of the center arm 40 has an outer diameter smaller than the inner diameter of the lower protruding tubular portion 34f. A spline is formed on the inner peripheral surface of the shaft coupling tubular portion 40c. The shaft coupling tubular portion 40c of the center arm 40 is inserted into a space defined by the lower protruding tubular portion 34f from below and spline-coupled to the spline portion 30d of the steering shaft 30. Below the center arm 40, the nut 41 and the cotter pin 42 are attached to the tip end portion 30e of the steering shaft 30. The upper end of the shaft coupling tubular portion 40c is in contact with the lower end of the inner ring 47 of the bearing 35. In this state, the tie rod mounting portions 40a of the center arm 40 are positioned below the sub-gusset frame members 14 as viewed from the side.

Figure 6:
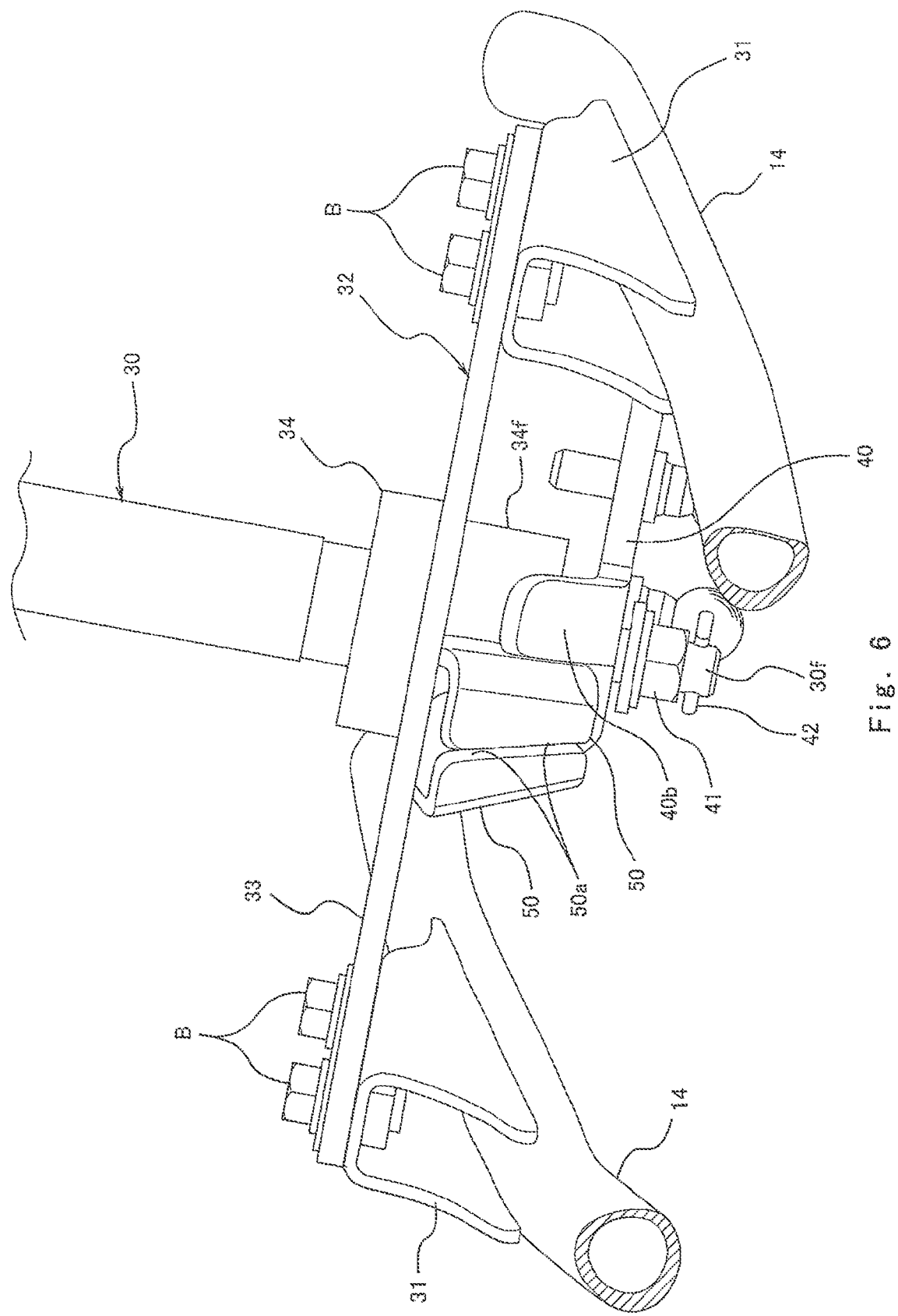
FIG. 6 is a perspective view of the constituents surrounding the steering shaft of the all terrain vehicle of FIG. 1, as viewed from left and front.

FIG. 6 is a perspective view of the constituents surrounding the steering shaft 30 of the all terrain vehicle 1 of FIG. 4, as viewed from left and front. As shown in FIGS. 5 and 6, the pair of right and left stoppers 40b are provided at the front end portion of the center arm 40 to protrude in an obliquely upward direction. A stopper receiver member 50 is attached to the steering support member 32. The stoppers 40b are configured to contact the stopper receiver member 50, respectively, to restrict a steering angle of the steering shaft 30. The stopper receiver member 50 is composed of a pair of plates which are bent in a substantially L-shape as viewed from above and symmetrically arranged, and their opposite end portions are welded to each other. The upper end of the stopper receiver member 50 is welded to the lower surface of the plate portion 33, and the rear end portion of the stopper receiver member 50 is welded to the outer peripheral surface of the lower protruding tubular portion 34f. When the steering shaft 30 is rotated to a certain degree, the side end of the stopper 40b interferes with the side surface of the stopper receiver member 50, thus determining a limit (maximum rotational angle) of a steering angle of the steering shaft 30.

In accordance with the above configuration, the bearing 35 coupled to the lower portion 30b of the steering shaft 30 is not supported on the gear box 19 coupled to the axles 20 but coupled to the steering shaft support member 32 coupled to the sub-gusset frame members 14 which are a part of the vehicle body frame 2. In this structure, if a large external force is applied from a road surface to the front wheels 3 during driving off-road of the all terrain vehicle 1, the external force is not directly transmitted to the bearing 35 to which the lower portion 30b of the steering shaft 30 is coupled. This allows the bearing 35 to operate smoothly and improves the driver's steering feel during driving off-road. In addition, since the external force applied from the road surface to the front wheels 3 is not directly transmitted to the bearing 35, a suspension operates smoothly, which improves suspension operation feel during driving off-road.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An all terrain vehicle comprising:
a steering shaft to which a handle is coupled;
a pair of right and left frame members extending in a longitudinal direction of a vehicle body, at both sides in a width direction of the vehicle body;
a steering shaft support member provided over and coupled to the pair of right and left frame members; and
a bearing configured to rotatably couple a lower portion of the steering shaft to the steering shaft support member,
wherein the steering shaft support member includes:
a plate portion disposed over the pair of right and left frame members and coupled to the right and left frame members, the plate portion having a shaft insertion hole in a center portion thereof, and
a bearing support tubular portion provided at the shaft insertion hole and configured to accommodate the bearing;
wherein the bearing is accommodated in the bearing support tubular portion such that the steering shaft is inserted into the shaft insertion hole of the plate portion in a normal line direction of the plate portion;
wherein the steering shaft is disposed such that its axis is tilted in a rearward direction;
wherein the pair of right and left frame members are provided with seat members, respectively, the seat members having support surfaces such that a normal line direction of the support surfaces substantially conforms to an axial direction of the steering shaft; and
wherein a right end portion and a left end portion of the plate portion are fastened to the seat members, respectively, in a state where a lower surface of the right end portion and a lower surface of the left end portion are in contact with the support surfaces of the seat members, respectively.

2. The all terrain vehicle according to claim 1,
wherein the bearing support tubular portion includes a bearing positioning portion configured to position the bearing; and
wherein the bearing positioned by the bearing positioning portion is disposed on a substantially same plane that the plate portion extends.

3. The all terrain vehicle according to claim 2,
wherein the bearing support tubular portion includes a lower protruding tubular portion protruding in a downward direction from the bearing positioning portion relative to the plate portion.

4. The all terrain vehicle according to claim 3, further comprising:
a pair of right and left front wheel support members configured to support right and left front wheels, respectively;
a center arm fastened to the lower portion of the steering shaft; and
a pair of right and left tie rods configured to couple the center arm to the pair of right and left front wheel support members;
wherein the center arm is disposed below the steering shaft support member;
wherein the center arm includes a shaft coupling tubular portion spline-coupled to the lower portion of the steering shaft, the shaft coupling tubular portion having an outer diameter smaller than an inner diameter of the lower protruding tubular portion; and wherein the shaft coupling tubular portion is inserted into a space defined by the lower protruding tubular portion from below.

5. The all terrain vehicle according to claim 3,
wherein the bearing support tubular portion includes a seal mounting portion protruding upward from the bearing positioning portion relative to the plate portion and configured to accommodate a seal member; and
wherein a protruding length of the lower protruding tubular portion in a downward direction from the bearing positioning portion is larger than a protruding length of the seal mounting portion in an upward direction from the bearing positioning portion.

6. The all terrain vehicle according to claim 1, further comprising:
a pair of right and left front wheel support members configured to support right and left front wheels, respectively;
a center arm fastened to the lower portion of the steering shaft; and
a pair of right and left tie rods configured to couple the center arm to the pair of right and left front wheel support members, respectively;
wherein the center arm is disposed below the steering shaft support member;
wherein the center arm includes a pair of right and left stoppers protruding in an obliquely upward direction; and
wherein a stopper receiver member is secured to the steering shaft support member, and the stoppers are configured to contact the stopper receiver member to restrict a steering angle of the steering shaft.

7. The all terrain vehicle according to claim 6,
wherein the bearing support tubular portion includes a bearing positioning portion configured to position the bearing on a substantially same plane that the plate portion extends and a lower protruding tubular portion protruding downward from the bearing positioning portion relative to the plate portion; and
wherein the stopper receiver member is welded to a lower surface of the plate portion and to an outer peripheral surface of the lower protruding tubular portion.

8. An all terrain vehicle comprising,
a steering shaft to which a handle is coupled;
a pair of right and left frame members extending in a longitudinal direction of a vehicle body, at both sides in a width direction of the vehicle body;
a steering shaft support member provided over and coupled to the pair of right and left frame members; and
a bearing configured to rotatably couple a lower portion of the steering shaft to the steering shaft support member,
wherein the steering shaft support member includes:
a plate portion disposed over the pair of right and left frame members and coupled to the right and left frame members, the plate portion having a shaft insertion hole in a center portion thereof, and
a bearing support tubular portion provided at the shaft insertion hole and configured to accommodate the bearing;
wherein the pair of right and left frame members are provided with seat members, respectively, the seat members having support surfaces;
wherein bolt holes are formed in a left end portion and a right end portion of the plate portion and the support surfaces of the seat members;
wherein bolts are inserted into the bolt holes of the plate portion and the bolt holes of the seat members in a state where the bolt holes of the plate portion conform to the bolt holes of the seat members, respectively; and
wherein the bolt holes of at least either the plate portion or the seat members are elongated holes.

9. An all terrain vehicle comprising:
a steering shaft to which a handle is coupled;
a pair of right and left frame members extending in a longitudinal direction of a vehicle body, at both sides in a width direction of the vehicle body;
a gear box disposed below a steering support shaft member and configured to transmit a driving power of an engine to right and left front wheels, respectively;
the steering shaft support member provided over and coupled to the pair of right and left frame members; and
a bearing configured to rotatably couple a lower portion of the steering shaft to the steering shaft support member,
wherein the steering shaft support member includes:
a plate portion disposed over the pair of right and left frame members and coupled to the right and left frame members, the plate portion having a shaft insertion hole in a center portion thereof,
wherein the plate portion has a hole through which a linear member coupled to the gear box extends,
wherein the linear member includes a cable coupled to the gear box; and
a bearing support tubular portion provided at the shaft insertion hole and configured to accommodate the bearing.

* * * * *